(12) United States Patent
Mochizuki (10) Patent No.: US 12,083,947 B2
(45) Date of Patent: Sep. 10, 2024

(54) VEHICLE LAMP SYSTEM

(71) Applicant: KOITO MANUFACTURING CO., LTD., Tokyo (JP)

(72) Inventor: Mitsuyuki Mochizuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/641,952

(22) PCT Filed: Aug. 12, 2020

(86) PCT No.: PCT/JP2020/030708
§ 371 (c)(1),
(2) Date: Mar. 10, 2022

(87) PCT Pub. No.: WO2021/049239
PCT Pub. Date: Mar. 18, 2021

(65) Prior Publication Data
US 2022/0305980 A1    Sep. 29, 2022

(30) Foreign Application Priority Data

Sep. 11, 2019  (JP) ................................. 2019-165514

(51) Int. Cl.
*B60Q 1/00*     (2006.01)
*B60Q 1/08*     (2006.01)
(Continued)

(52) U.S. Cl.
CPC .......... *B60Q 1/0023* (2013.01); *B60Q 1/085* (2013.01); *B60Q 1/143* (2013.01); *B60Q 1/249* (2022.05);
(Continued)

(58) Field of Classification Search
CPC .......................... B60Q 1/143; B60Q 2300/45; B60Q 2400/50; B60Q 1/085; B60Q 2300/056;
(Continued)

(56) References Cited

U.S. PATENT DOCUMENTS 9,731,645 B1    8/2017  Taleb-Bendiab
2005/0111698 A1    5/2005  Kawai
(Continued)

FOREIGN PATENT DOCUMENTS

EP    2 700 538 A1    2/2014
JP    2006-318093 A   11/2006
(Continued)

OTHER PUBLICATIONS

Extended European Search Report dated Oct. 7, 2022, issued by the European Patent Office in counterpart European Patent Application No. 20863162.2.
(Continued)

*Primary Examiner* — Wei (Victor) Y Chan
(74) *Attorney, Agent, or Firm* — Sughrue Mion, PLLC (57) ABSTRACT

A vehicle lamp system mounted on a vehicle includes an in-vehicle sensor includes an IR light source, a scanning unit, an infrared camera, a region setting unit for comparing information acquired from the in-vehicle sensor and information acquired by the infrared camera and setting a dimming area and/or an emphasis area, and a lamp control unit for controlling an applied power amount and turning on and off of the IR light source such that a specific region is irradiated with the infrared rays emitted from the IR light source based on output of the region setting unit.

10 Claims, 10 Drawing Sheets

(51) Int. Cl.
  *B60Q 1/14*   (2006.01)
  *B60Q 1/24*   (2006.01)
  *G06V 20/58*  (2022.01)
  *H04N 5/33*   (2023.01)
  *H05B 47/125* (2020.01)

(52) U.S. Cl.
  CPC ........... *G06V 20/58* (2022.01); *H05B 47/125* (2020.01); *H04N 5/33* (2013.01)

(58) Field of Classification Search
  CPC .... B60Q 1/0023; B60Q 1/50; B60Q 2300/42; B60Q 1/507
  See application file for complete search history.

(56) References Cited

U.S. PATENT DOCUMENTS

| | | | |
|---|---|---|---|
| 2007/0102214 A1 | 5/2007 | Wittorf et al. | |
| 2014/0145838 A1 | 5/2014 | Tuukkanen | |
| 2015/0137680 A1* | 5/2015 | Komatsu | B60Q 1/0023 315/82 |
| 2015/0350572 A1* | 12/2015 | Hattori | G02B 23/12 250/332 |
| 2018/0004020 A1 | 1/2018 | Kunii et al. | |
| 2021/0232842 A1* | 7/2021 | Yamamoto | G06V 20/56 |

FOREIGN PATENT DOCUMENTS

| | | |
|---|---|---|
| JP | 2010-97410 A | 4/2010 |
| JP | 2014-127924 A | 7/2014 |
| WO | 2014/024385 A1 | 2/2014 |

OTHER PUBLICATIONS

International Search Report dated Oct. 6, 2020 issued by the International Searching Authority in counterpart International Application No. PCT/JP2020/030708 (PCT/ISA/210).

International Written Opinion dated Oct. 6, 2020 issued by the International Searching Authority in counterpart International Application No. PCT/JP2020/030708 (PCT/ISA/237).

Office Action dated Mar. 6, 2024, issued by the European Patent Office in counterpart European Patent Application No. 20863162.2.

\* cited by examiner

VEHICLE LAMP SYSTEM

This application is a National Stage of International Application No. PCT/JP2020/030708, filed Aug. 12, 2020, claiming priority based on Japanese Patent Application No. 2019-165514, filed Sep. 11, 2019, the contents of all of which are incorporated herein by reference in their entirety.

TECHNICAL FIELD

The present invention relates to a vehicle lamp system used in a vehicle such as an automobile.

BACKGROUND ART

Patent Literature 1 or the like discloses a night-vision device mounted on an automobile. In Patent Literature 1, a clear image is obtained by controlling a light projecting unit based on an image captured by an imaging unit.

CITATION LIST

Patent Literature

Patent Literature 1: JP2014-127924A

SUMMARY OF INVENTION

Technical Problem

An object of the present invention is to provide a vehicle lamp system in which detection accuracy of an infrared camera is further improved.

Solution to Problem

According to one aspect of the present invention, there is provided a vehicle lamp system is a vehicle lamp system mounted on a vehicle including an in-vehicle sensor configured to acquire information on surroundings of the vehicle, the vehicle lamp system includes:
  an IR light source configured to emit infrared rays;
  a scanning unit configured to emit the infrared rays emitted from the IR light source toward a front of a lamp to perform scanning;
  an infrared camera having high sensitivity to a wavelength of the infrared rays emitted from the IR light source;
  a region setting unit configured to set at least one of a dimming region and an emphasis region by comparing information acquired from the in-vehicle sensor with information acquired by the infrared camera; and
  a lamp control unit configured to control turning on and off and an applied power amount of the IR light source, such that a specific region is irradiated with the infrared rays emitted from the IR light source based on output of the region setting unit.

In the vehicle lamp system according to the present invention described above,
  when at a certain position, first object information indicating an object is acquired from the in-vehicle sensor and second object information indicating the object is not acquired from the infrared camera, the region setting unit sets the certain position as the emphasis region, and
  the lamp control unit may control the IR light source such that the emphasis region is irradiated with infrared rays at illuminance higher than that of other regions.

In the vehicle lamp system according to the present invention described above,
  the region setting unit sets, as the dimming region, a region corresponding to a pixel having a luminance higher than a predetermined value in an image acquired by the infrared camera, and
  the lamp control unit may control the IR light source such that the dimming region is irradiated with infrared rays at illuminance lower than that of other regions.

The vehicle lamp system according to the present invention described above further includes:
  an own vehicle position acquisition device configured to acquire position information on an own vehicle using a global positioning satellite system; and
  an other-object position acquisition device configured to acquire position information on a pedestrian or a bicycle from an infrastructure facility or another vehicle.

The lamp control unit may calculate a direction of the pedestrian or the bicycle as viewed from the own vehicle, and control the IR light source such that the direction of the pedestrian or the bicycle is emphasized to be irradiated or the direction of the pedestrian or the bicycle is prevented from being irradiated.

In the vehicle lamp system according to the present invention described above,
  the other-object position acquisition device may be formed to acquire, via the infrastructure facility, a signal issued by a portable terminal carried by the pedestrian or a driver of the bicycle.

In the vehicle lamp system according to the present invention described above,
  the lamp control unit may compare the position information on the pedestrian or the bicycle acquired by the other-object position acquisition device with the image acquired by the infrared camera, and when the pedestrian or the bicycle acquired by the other-object position acquisition device cannot be distinguished from the image, the lamp control unit may control the IR light source such that infrared rays are emphasized to emit toward a position of the position information.

In the vehicle lamp system according to the present invention described above,
  when the lamp control unit may determine that the pedestrian or the bicycle moves in a direction crossing a front of the own vehicle based on information acquired by the own vehicle position acquisition device and the other-object position acquisition device, the lamp control unit may control the IR light source such that infrared rays are emphasized to emit in the direction of the pedestrian or the bicycle.

In the vehicle lamp system according to the present invention described above,
  when the position information on the pedestrian or the bicycle acquired by the other-object position acquisition device and position information on the pedestrian or the bicycle acquired by the in-vehicle sensor coincide with each other, and a position of the pedestrian or the bicycle cannot be estimated based on the infrared camera, the lamp control unit may control the IR light source such that infrared rays are emphasized to emit in the direction of the pedestrian or the bicycle.

Advantageous Effects of Invention

According to the present invention, a vehicle lamp system in which detection accuracy of an infrared camera is further improved is provided.

DESCRIPTION OF EMBODIMENTS

Hereinafter, the present invention will be described based on an embodiment with reference to the drawings. The same or equivalent components, members, and processing shown in the drawings are denoted by the same reference numerals, and repeated description thereof will be omitted as appropriate. The embodiments are not intended to limit the scope of the present invention and are merely used for description, and all features described in the embodiments and combinations thereof are not necessarily essential features of the present invention.

Figure 1:
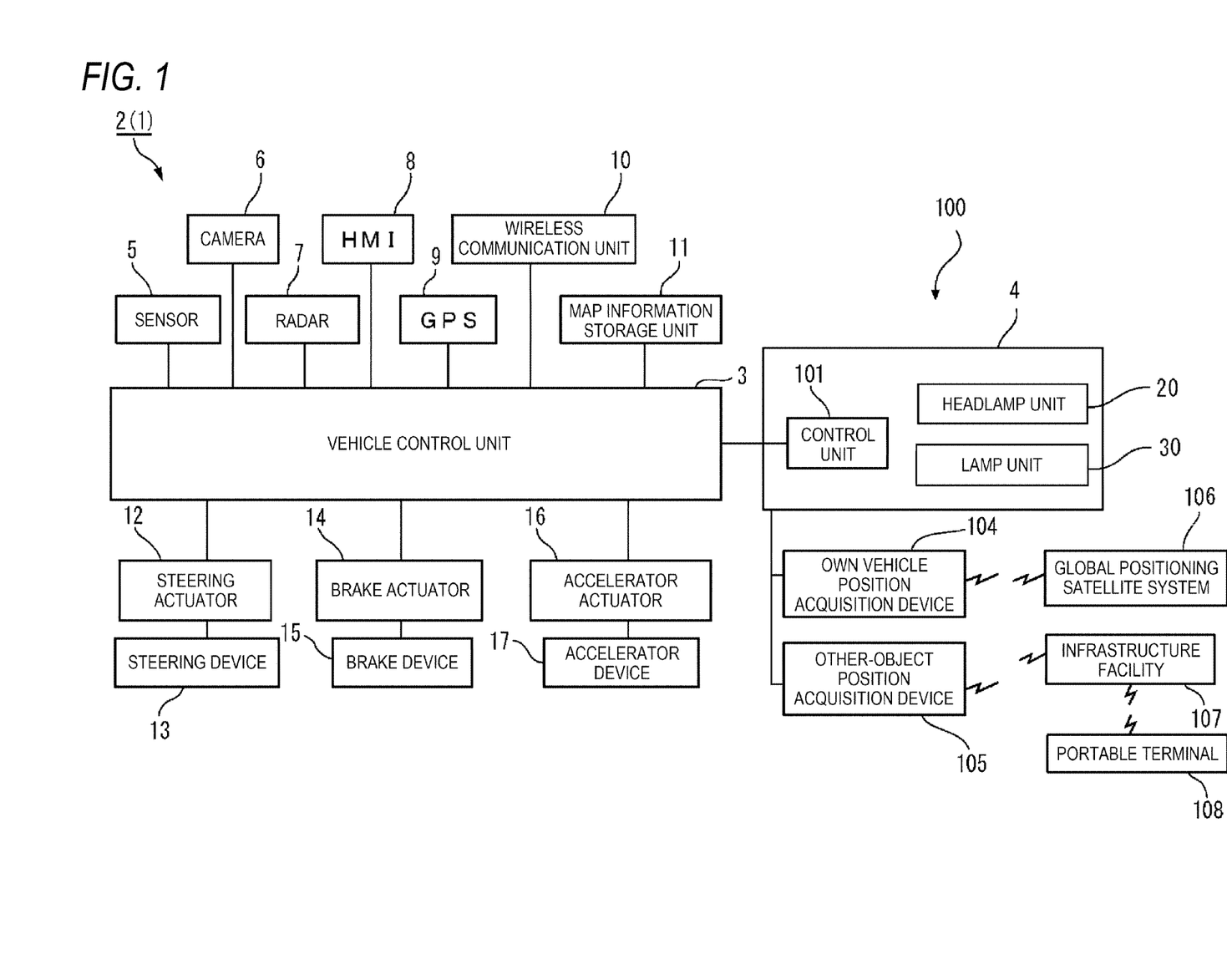
FIG. 1 is a block diagram of a vehicle system in which a vehicle lamp system according to an embodiment of the present invention is incorporated.

FIG. 1 is a block diagram of a vehicle system 2 in which a vehicle lamp system 100 according to the embodiment of the present invention is incorporated. As shown in FIG. 1, the vehicle system 2 according to the present embodiment includes a vehicle control unit 3, a vehicle lamp 4, a sensor 5, a camera 6, a radar 7, a human machine interface (HMI) 8, a global positioning system (GPS) 9, a wireless communication unit 10, and a map information storage unit 11. The vehicle system 2 further includes a steering actuator 12, a steering device 13, a brake actuator 14, a brake device 15, an accelerator actuator 16, and an accelerator device 17.

The vehicle control unit 3 is formed to control traveling of a vehicle 1. The vehicle control unit 3 includes, for example, an electronic control unit (ECU). The electronic control unit includes a microcontroller including a processor and a memory, and other electronic circuits (for example, a transistor and the like). The processor is, for example, a central processing unit (CPU), a micro processing unit (MPU), and/or a graphics processing unit (GPU). The memory includes a read only memory (ROM) in which various vehicle control programs (for example, an artificial intelligence (AI) program for automatic driving and the like) are stored, and a random access memory (RAM) in which various types of vehicle control data are temporarily stored. The processor is formed to load a program designated from the various vehicle control programs stored in the ROM onto the RAM and execute various kinds of processing in cooperation with the RAM.

The sensor 5 includes an acceleration sensor, a speed sensor, a gyro sensor, and the like. The sensor 5 is formed to detect a traveling state of the vehicle 1 and output traveling state information to the vehicle control unit 3. The sensor 5 may further include a seating sensor that detects whether a driver is seated in a driver seat, a face orientation sensor that detects an orientation of the face of the driver, an external weather sensor that detects an external weather condition, a human sensor that detects whether there is a person in the vehicle, and the like. The sensor 5 may further include an illuminance sensor that detects illuminance of a surrounding environment of the vehicle 1.

The camera (in-vehicle camera) 6 is, for example, a camera including an imaging element such as a charge-coupled device (CCD) or a complementary MOS (CMOS). Imaging performed by the camera 6 is controlled based on a signal transmitted from the vehicle control unit 3. The camera 6 can generate an image based on received visible light.

The radar 7 is a millimeter wave radar, a microwave radar, a laser radar, or the like. The radar 7 may include light detection and ranging or laser imaging detection and ranging (LiDAR). In general, the LiDAR is a sensor that emits invisible light in front of the LiDAR and acquires information such as a distance to an object, a shape of the object, and a material of the object based on emitted light and returned light. The camera 6 and the radar 7 (an example of a sensor) are formed to detect the surrounding environment of the vehicle 1 (another vehicle, a pedestrian, a road shape, a traffic sign, an obstacle, and the like), and output surrounding environment information to the vehicle control unit 3.

The HMI 8 includes an input unit that receives an input operation from the driver and an output unit that outputs traveling information and the like to the driver. The input unit includes a steering wheel, an accelerator pedal, a brake pedal, a driving mode changeover switch which switches a driving mode of the vehicle 1, and the like. The output unit is a display that displays various kinds of traveling information.

The GPS 9 is formed to acquire current position information on the vehicle 1 and output the acquired current position information to the vehicle control unit 3. The wireless communication unit 10 is formed to receive information (for example, traveling information) related to another vehicle present surrounding the vehicle 1 from the another vehicle and transmits information (for example, traveling information) related to the vehicle 1 to the another vehicle (vehicle-to-vehicle communication). Further, the wireless communication unit 10 is formed to receive infrastructure information from an infrastructure facility such as traffic lights or a sign lamp and transmit traveling information on the vehicle 1 to the infrastructure facility (road-to-vehicle communication). The map information storage unit 11 is an external storage device such as a hard disk drive in which map information is stored, and is formed to output the map information to the vehicle control unit 3.

When the vehicle 1 travels in an automatic driving mode, the vehicle control unit 3 automatically generates at least one of a steering control signal, an accelerator control signal, and a brake control signal based on the traveling state information, the surrounding environment information, the current position information, the map information, and the like. The steering actuator 12 is formed to receive the steering control signal from the vehicle control unit 3 and control the steering device 13 based on the received steering control signal. The brake actuator 14 is formed to receive the brake control signal from the vehicle control unit 3 and control the brake device 15 based on the received brake control signal. The accelerator actuator 16 is formed to receive the accelerator control signal from the vehicle control unit 3 and control the accelerator device 17 based on the received accelerator control signal. In this manner, the traveling of the vehicle 1 is automatically controlled by the vehicle system 2 in the automatic driving mode.

On the other hand, when the vehicle 1 travels in a manual driving mode, the vehicle control unit 3 generates a steering control signal, an accelerator control signal, and a brake control signal according to a manual operation of the driver performed on the accelerator pedal, the brake pedal, and the steering wheel. In this manner, since the steering control signal, the accelerator control signal, and the brake control signal are generated by the manual operation of the driver, the traveling of the vehicle 1 is controlled by the driver in the manual driving mode.

Next, a driving mode of the vehicle 1 will be described. The driving mode includes the automatic driving mode and the manual driving mode. The automatic driving mode includes a fully automatic driving mode, an advanced driving support mode, and a driving support mode. In the fully automatic driving mode, the vehicle system 2 automatically performs all kinds of traveling control including steering control, brake control, and accelerator control, and the driver cannot drive the vehicle 1. In the advanced driving support mode, the vehicle system 2 automatically performs all kinds of traveling control including the steering control, the brake control, and the accelerator control, and the driver can drive the vehicle 1 but does not drive the vehicle 1. In the driving support mode, the vehicle system 2 automatically performs a part of the steering control, the brake control, and the accelerator control, and the driver drives the vehicle 1 under driving support of the vehicle system 2. On the other hand, in the manual driving mode, the vehicle system 2 does not automatically perform the traveling control, and the driver drives the vehicle 1 without the driving support of the vehicle system 2.

The driving mode of the vehicle 1 may be switched by operating the driving mode changeover switch. In this case, the vehicle control unit 3 switches the driving mode of the vehicle 1 among the four driving modes (the fully automatic driving mode, the advanced driving support mode, the driving support mode, and the manual driving mode) according to an operation of the driver performed on the driving mode changeover switch. The driving mode of the vehicle 1 may be automatically switched based on information on a travelable section where an automatic driving vehicle can travel or a traveling prohibited section where traveling of the automatic driving vehicle is prohibited, or information on the external weather condition. In this case, the vehicle control unit 3 switches the driving mode of the vehicle 1 based on the information described above. Further, the driving mode of the vehicle 1 may be automatically switched by using the seating sensor, the face orientation sensor, and the like. In this case, the vehicle control unit 3 switches the driving mode of the vehicle 1 based on an output signal from the seating sensor or the face orientation sensor.

Figure 2:
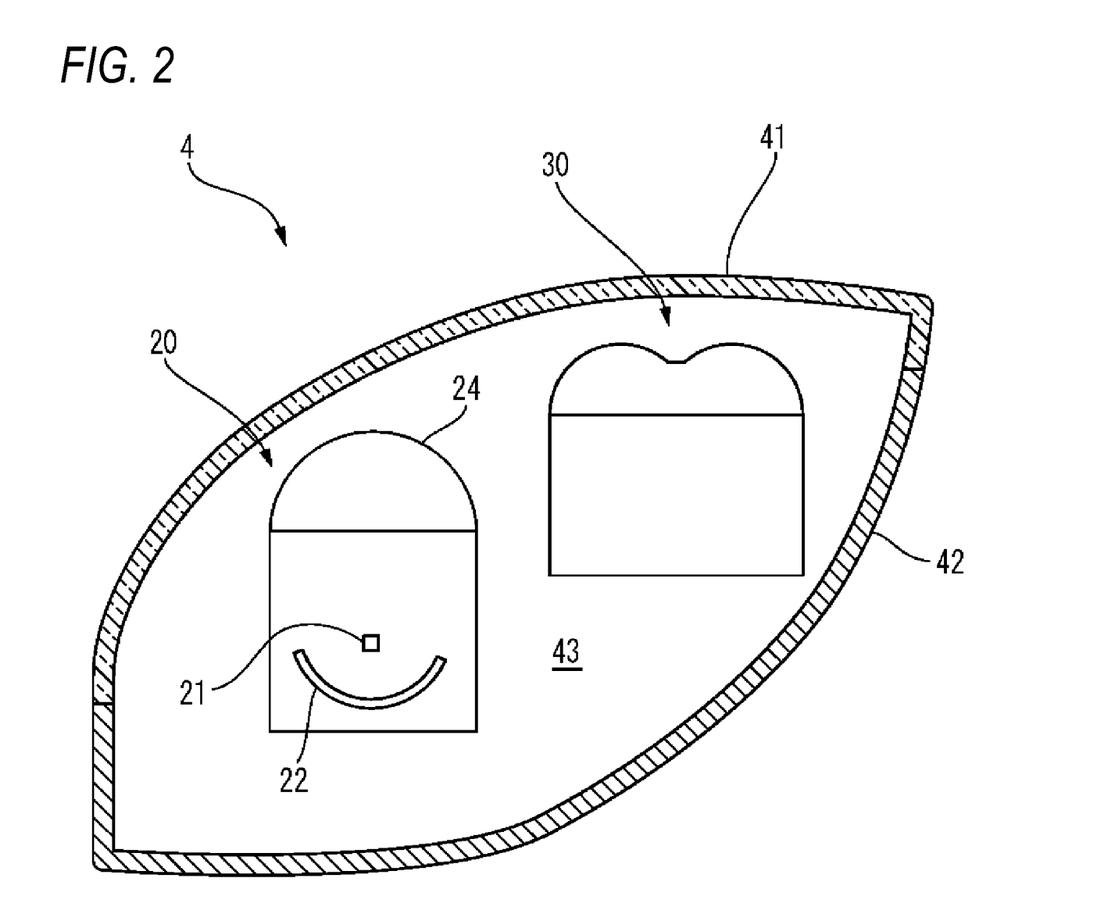
FIG. 2 is a sectional view of a vehicle lamp to be incorporated in the vehicle lamp system according to the embodiment of the present invention.

FIG. 2 is a sectional view of the vehicle lamp 4 to be incorporated in the vehicle lamp system 100 according to the embodiment of the present invention. As shown in FIG. 2, the vehicle lamp 4 is mounted with a headlamp unit 20 capable of emitting a low beam and a high beam, and a lamp unit 30 capable of emitting infrared rays. The headlamp unit 20 and the lamp unit 30 are provided in a common lamp chamber 43 formed by an outer cover 41 and a housing 42. The vehicle lamp 4 is mounted on a front portion of the vehicle 1. The headlamp unit 20 and the lamp unit 30 are controlled by a control unit 101.

The headlamp unit 20 is a paraboloidal reflector-type or projector type lamp unit. In the illustrated example, the headlamp unit 20 includes a light source 21, a reflector 22, and a projection lens 24. As the light source 21 of the headlamp unit 20, an incandescent lamp having a filament such as a halogen lamp, a high intensity discharge (HID) lamp such as a metal halide lamp, a light emitting diode (LED), or the like can be used. The headlamp unit 20 can form a known high beam light distribution pattern and a low beam light distribution pattern.

Figure 3:
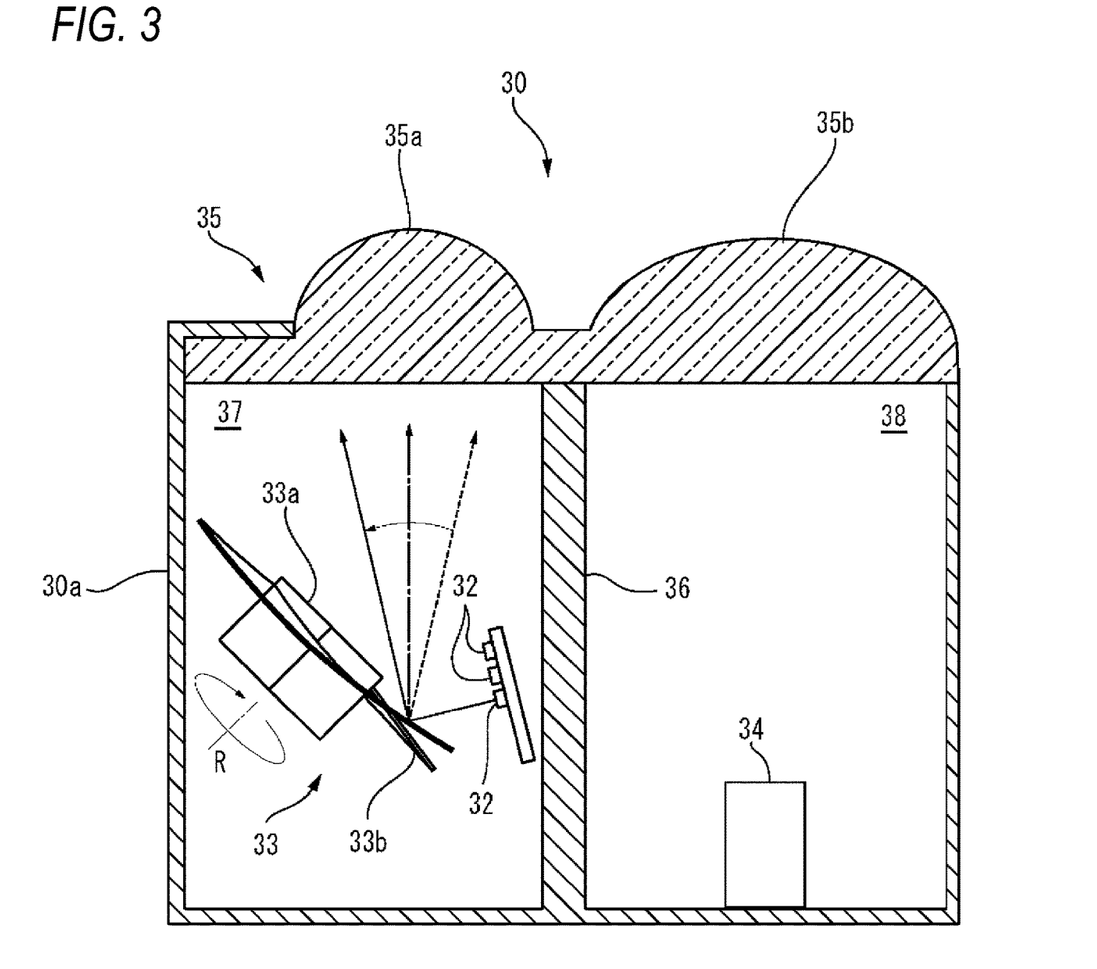
FIG. 3 is a schematic view showing an internal configuration of a lamp unit.

FIG. 3 is a schematic view showing an internal configuration of the lamp unit 30. As shown in FIG. 3, the lamp unit 30 includes a housing 30a, an IR light source 32 that emits infrared rays, a rotary reflector 33 (scanning unit), an infrared camera 34, a lens component 35, and a light shielding wall 36. The inside of the housing 30a is partitioned into two spaces of a first lamp chamber 37 and a second lamp chamber 38 by the light shielding wall 36. The IR light source 32 and the rotary reflector 33 are provided in the first lamp chamber 37. The infrared camera 34 is provided in the second lamp chamber 38.

The IR light source 32 is formed by a laser diode (LD) that emits infrared rays. The IR light source may be formed by a light emitting diode (LED) other than the LD.

The rotary reflector 33 rotates around a rotation axis R. The rotary reflector 33 includes a shaft portion 33a extending around the rotation axis R and two blades 33b extending from the shaft portion 33a in a radial direction. Surfaces of the blades 33b are reflective surfaces. The reflective surfaces each has a twisted shape in which an angle with respect to the rotation axis R gradually changes in a circumferential direction. Specifically, when visible light emitted from the IR light source 32 is reflected by the reflective surfaces of the rotary reflector 33, a direction in which the visible light is reflected and emitted gradually changes from a left end to a right end described in detail in FIG. 5. Accordingly, in the lamp unit 30, light can be emitted from the IR light source 32 to a region of a predetermined range so as to scan the region.

The lens component 35 is provided in front of the housing 30a. The lens component 35 includes a first lens element 35a and a second lens element 35b. The first lens element 35a is located in front of the first lamp chamber 37. Light emitted from the IR light source 32 and reflected by the rotary reflector 33 is incident on the first lens element 35a. The second lens element 35b is located in front of the second lamp chamber 38. The second lens element 35b collects light from the front of the lamp and guides the light to the infrared camera 34.

The infrared camera 34 is a camera having highest sensitivity to a peak wavelength of infrared rays emitted from the IR light source 32. The infrared camera 34 can acquire an image corresponding to reflected light of infrared rays emitted from the IR light source 32 to the front of the lamp. The image acquired by the infrared camera 34 is transmitted to the control unit 101.

Figure 4:
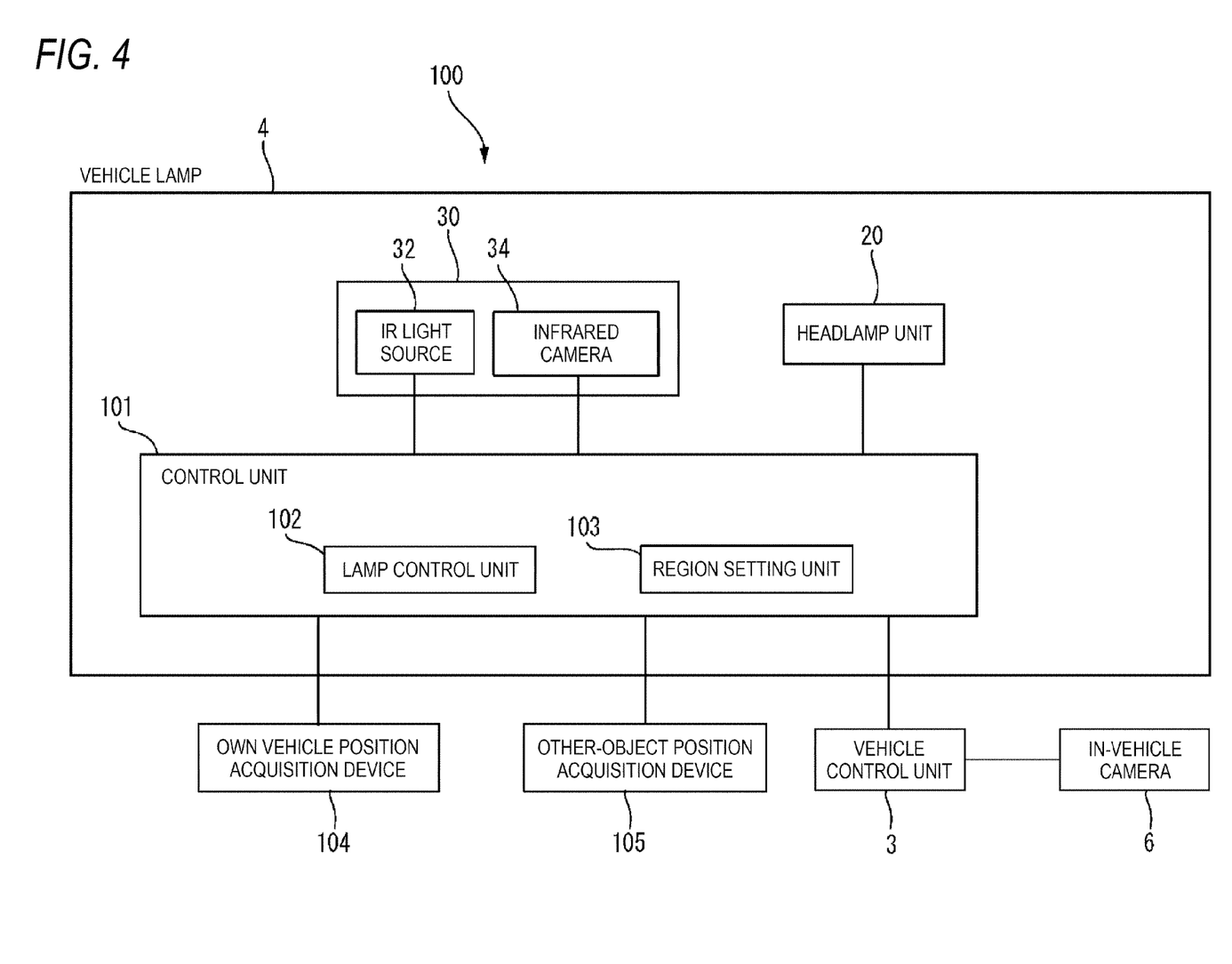
FIG. 4 is a system block diagram of the vehicle lamp system.

FIG. 4 is a system block diagram of the vehicle lamp system 100. As shown in FIG. 4, the vehicle lamp system 100 includes the control unit 101 in addition to the lamp unit 30 described above. The control unit 101 is communicably connected to the lamp unit 30. The control unit 101 includes a lamp control unit 102 that controls a lighting state and an applied current amount (applied power amount) of the IR light source 32, and a region setting unit 103 that sets a normal region, a dimming region, and an emphasis region, which will be described later.

Figure 5:
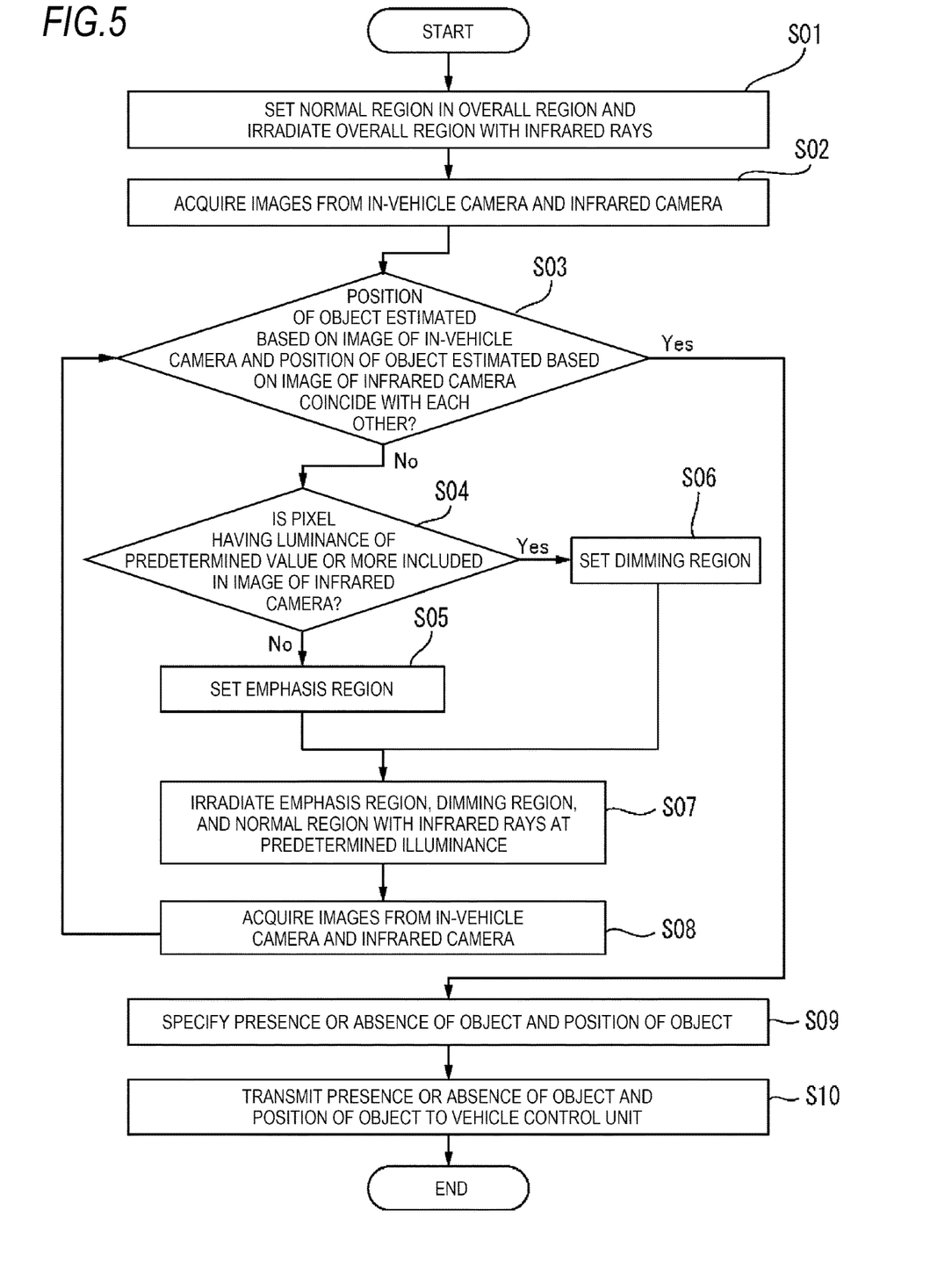
FIG. 5 is a flowchart of a process executed by the vehicle lamp system.

FIG. 5 is a flowchart of a process executed by the vehicle lamp system 100. As shown in FIG. 5, first, the region setting unit 103 of the control unit 101 sets the normal region in an overall region of an irradiation range of the IR light source 32, supplies a current having a first current value to the IR light source 32, and irradiates the overall region with infrared rays at the same illuminance (step S01). In the following description, the headlamp unit 20 is always turned on, and a light distribution pattern emitted by the headlamp unit 20 is not changed.

Figure 6:
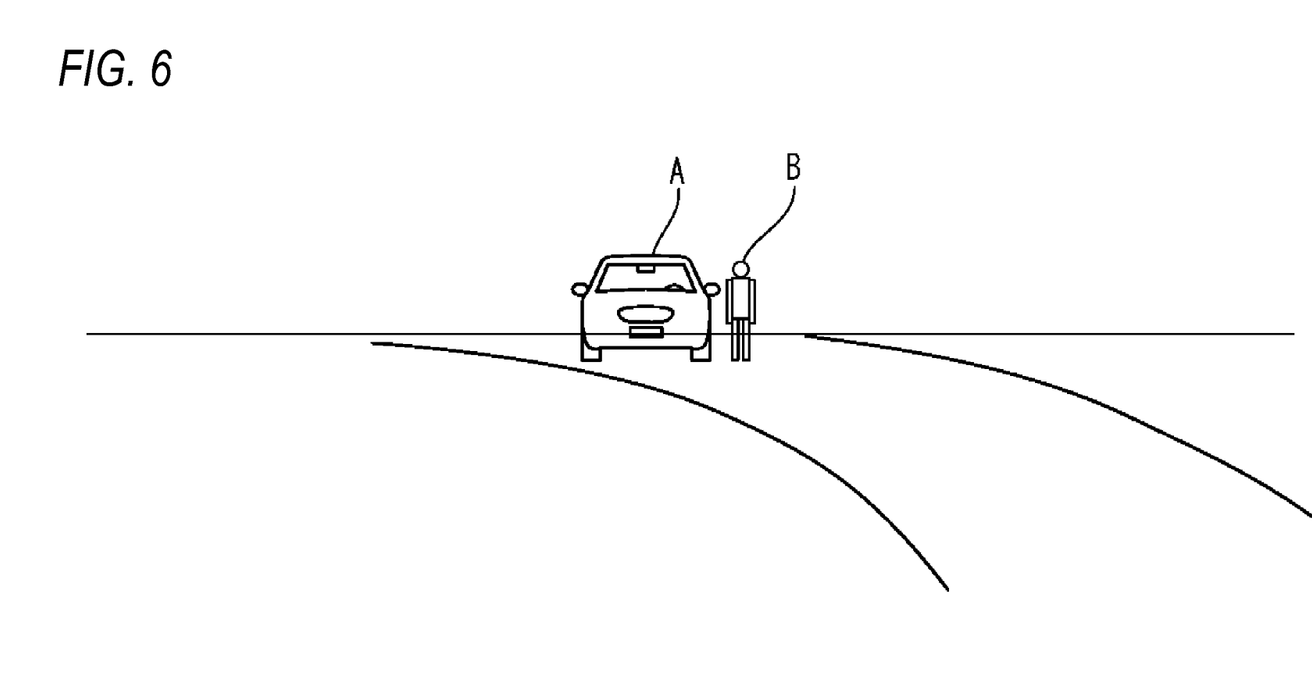
FIG. 6 shows an image acquired by an in-vehicle camera at a time t1.
Figure 7:
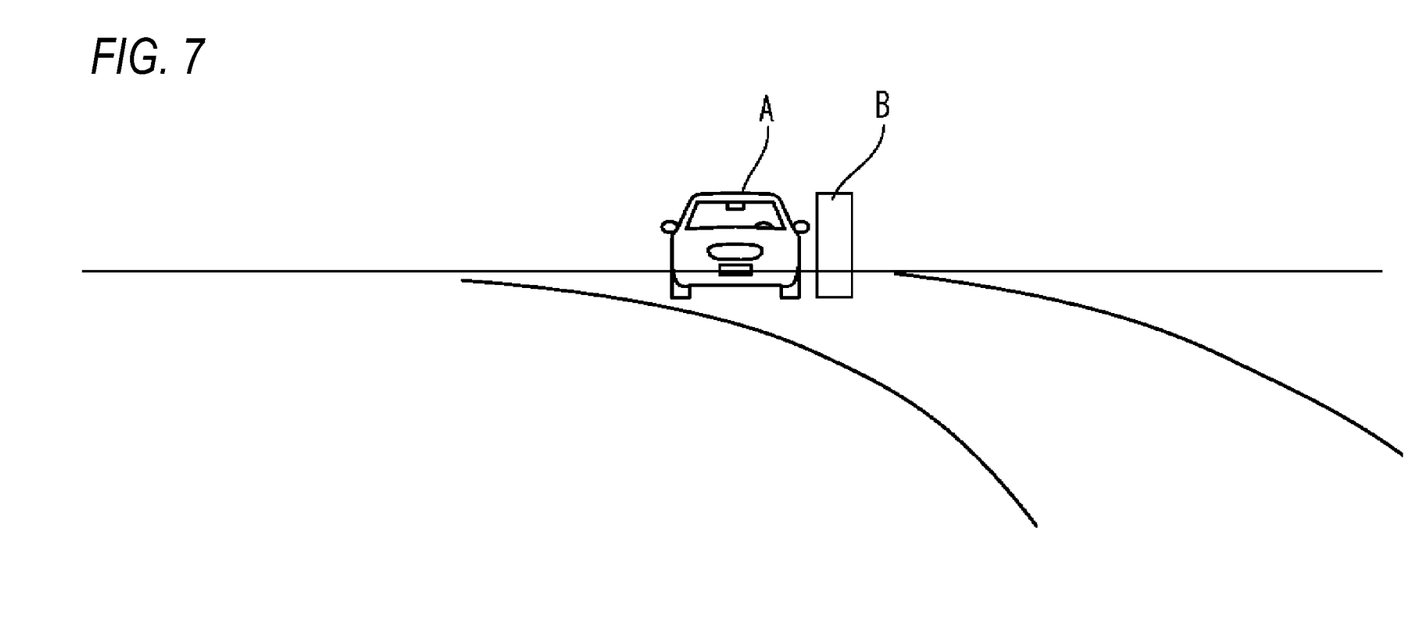
FIG. 7 shows an image acquired by an infrared camera at the time t1.

Next, the control unit 101 acquires an image from the in-vehicle camera 6 as shown in FIG. 6 and an image from the infrared camera 34 as shown in FIG. 7 at a time t1 when the overall region is irradiated with infrared rays at the same illuminance (step S02).

Here, as shown in FIG. 6, at the time t1, the in-vehicle camera 6 images an oncoming vehicle A and a pedestrian B in front of the own vehicle. On the other hand, as shown in FIG. 7, at the time t1, the infrared camera 34 images the oncoming vehicle A in front of the own vehicle, but the pedestrian B cannot be imaged. For example, a surface of the vehicle is made of metal and easily reflects infrared rays. On the other hand, skin and clothes of the pedestrian B hardly reflect infrared rays. Therefore, the infrared camera 34 may not be able to image the pedestrian B.

Therefore, in the vehicle lamp system 100 according to the present embodiment, the image acquired by the in-vehicle camera 6 and the image acquired by the infrared camera 34 are compared with each other. Specifically, the control unit 101 specifies a first position at which it is estimated that objects such as the oncoming vehicle A and the pedestrian B are present based on the image of the in-vehicle camera 6. In addition, the control unit 101 specifies a second position at which it is estimated that the objects are present based on the image of the infrared camera 34. The control unit 101 determines whether the first position and the second position coincide with each other (step S03). The first position coinciding with the second position means that the numbers of objects estimated as present of the first position and the second position coincide with each other, and coordinates (directions) of the objects estimated as present coincide with each other. When the first position and the second position coincide with each other (step S3: Yes), it is determined that the objects are present at the position, presence or absence of the objects and positions thereof are specified (step S09), and information thereof is transmitted to the vehicle control unit 3 (step S10).

On the other hand, as shown in FIGS. 6 and 7, when the first position estimated based on the image of the in-vehicle camera 6 and the second position estimated based on the image of the infrared camera 34 are different from each other (step S03: No), the following control is performed.

When it is estimated that in a region in which it is estimated that the object is present in the image of the in-vehicle camera 6 as shown in FIG. 6, the object is not present in the image of the infrared camera 34 as shown in FIG. 7 (step S03: No), and when a pixel having a luminance of a predetermined value or more is not included in the image of the infrared camera 34 (step S04: No), the region setting unit 103 sets an emphasis region P in "the region in which it is estimated that the object is present in the image of the in-vehicle camera 6 and in which it is estimated that object is not present in the image of the infrared camera 34" as shown in FIG. 7 (step S05). In addition, the region setting unit 103 sets the normal region in a region other than the region set as the emphasis region P.

Figure 8:
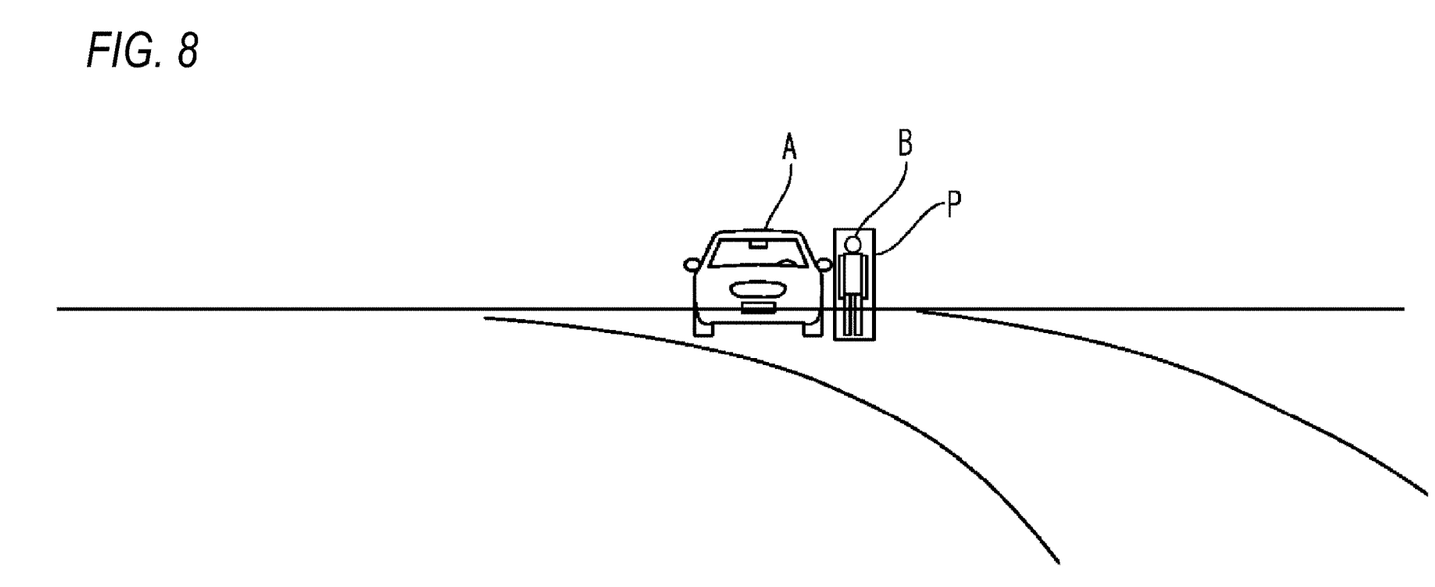
FIG. 8 shows an image captured by the infrared camera after an emphasis region is irradiated with infrared rays at high illuminance.

The lamp control unit 102 irradiates the normal region and the emphasis region P with infrared rays at predetermined illuminance (step S07). Specifically, the lamp control unit 102 supplies the current having the first current value to the IR light source 32 to emit infrared rays toward the normal region, and supplies a current having a second current value larger than the first current value to the IR light source 32 to emit infrared rays toward the emphasis region P. As a result, the emphasis region P is irradiated with infrared rays at illuminance higher than illuminance at which the normal region is irradiated with infrared rays. FIG. 8 shows an image captured by the infrared camera 34 after the emphasis region P is irradiated with infrared rays at high illuminance. FIG. 8 shows a state in which the emphasis region P is irradiated with infrared rays at high illuminance, and as a result, reflection intensity of infrared rays from the pedestrian B is sufficiently high, so that the pedestrian B is imaged by the infrared camera 34.

The control unit 101 sets the normal region and the emphasis region P as described above, irradiates the normal region and the emphasis region P with infrared rays at predetermined illuminance, acquires an image of the in-vehicle camera 6 and an image of the infrared camera 34 again (step S08), and determines whether a position of the object estimated based on the image of the in-vehicle camera 6 and a position of the object estimated based on the image of the infrared camera 34 coincide with each other (step S03).

Figure 9:
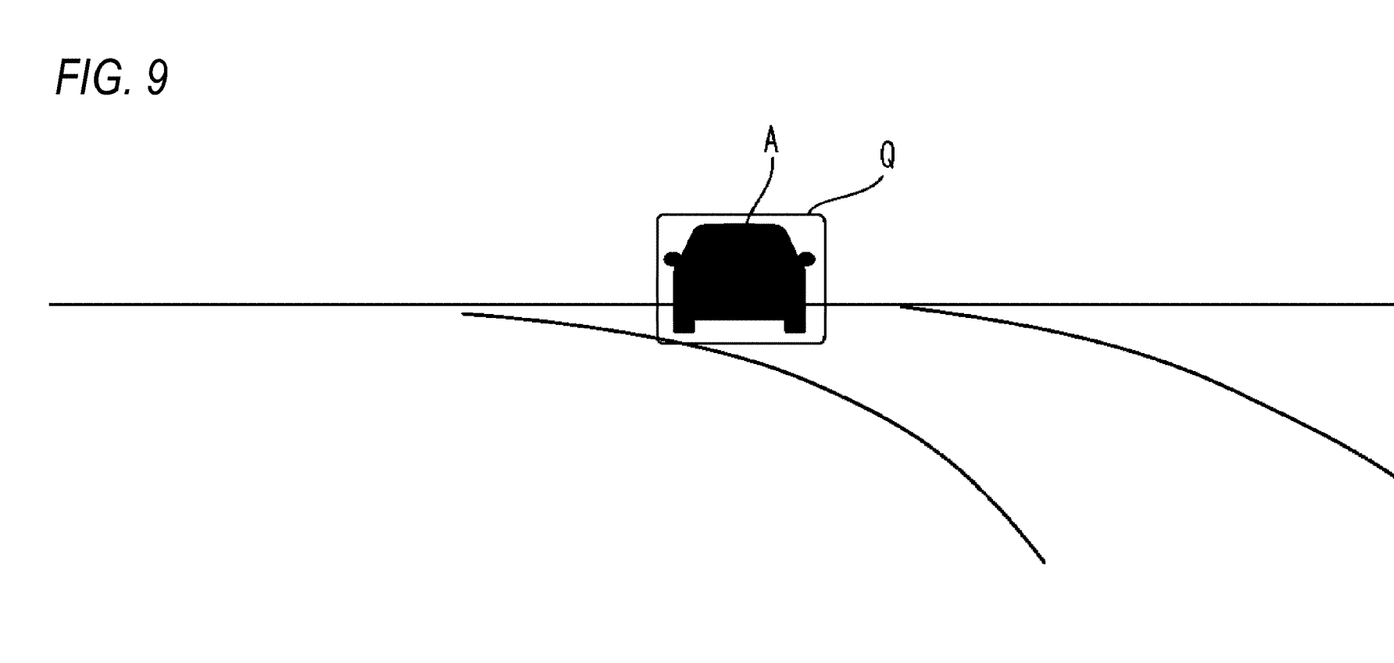
FIG. 9 shows an image in which whiteout occurs, the image being acquired by the infrared camera.

On the other hand, there is a case in which the infrared camera 34 cannot detect reflected light of infrared rays of another object since reflection intensity of infrared rays of a part of the object is too large. In this case, exposure of infrared rays is too much and whiteout occurs in a part of the image of the infrared camera 34. FIG. 9 shows an image captured by the infrared camera 34 at the same time t1 as in FIG. 6. This image shows a state in which intensity of infrared rays reflected by the oncoming vehicle A is too strong, and the infrared camera 34 cannot image the pedestrian B on a right side of the oncoming vehicle A.

In such a case, when it is estimated that in the region in which it is estimated that the object is present in the image of the in-vehicle camera 6, the object is not present in the image of the infrared camera 34 (step S03: No), and when a pixel having a luminance of the predetermined value or more is included in the image of the infrared camera 34 (step S04: Yes), the region setting unit 103 sets a dimming region Q in a region of the image of the infrared camera 34 in which a luminance is equal to or higher than the predetermined value (step S06). In the example illustrated in FIG. 9, the region setting unit 103 sets the dimming region Q in a region in which the oncoming vehicle A is imaged. In addition, the region setting unit 103 sets the normal region in a region other than the region set as the dimming region Q.

Figure 10:
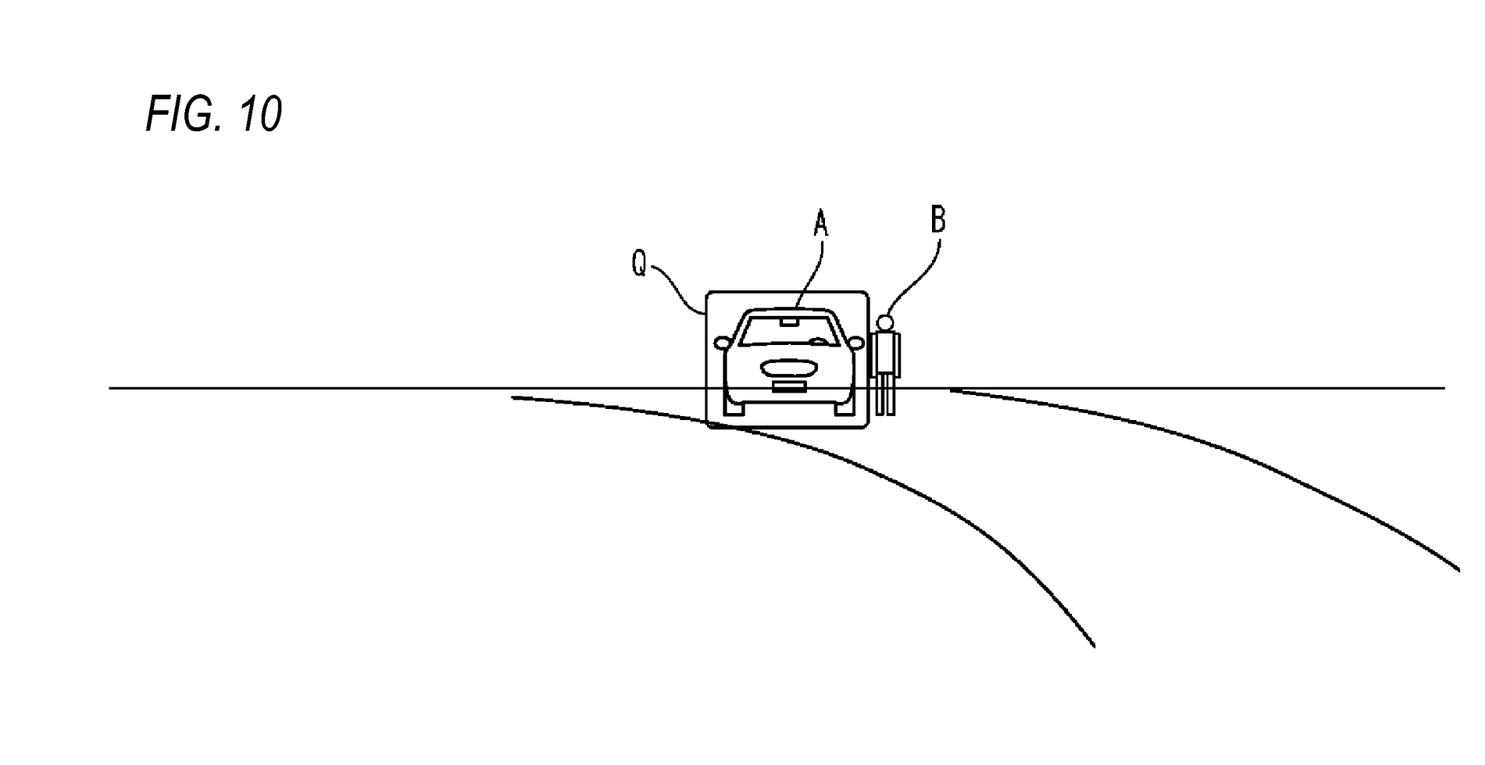
FIG. 10 shows an image captured by the infrared camera after a dimming region is irradiated with infrared ray at weak illuminance.

The control unit 101 irradiates the normal region and the dimming region Q with infrared rays at predetermined illuminance (step S07). Specifically, the lamp control unit 102 supplies the current having the first current value to the IR light source 32 to emit infrared rays toward the normal region, and supplies a current having a third current value smaller than the first current value to the IR light source 32 to emit infrared rays toward the dimming region Q. As a result, the dimming region Q is irradiated with infrared rays at illuminance weaker than illuminance at which the normal region is irradiated with infrared rays. FIG. 10 shows an image captured by the infrared camera 34 after the dimming region Q is irradiated with infrared ray at weak illuminance. FIG. 10 shows a state in which the dimming region Q is irradiated with infrared rays at weak illuminance, and as a result, an intensity difference between intensity of reflected light from the oncoming vehicle A and intensity of reflected light from the pedestrian B is reduced, so that both the oncoming vehicle A and the pedestrian B are imaged by the infrared camera 34.

The control unit 101 sets the normal region and the dimming region Q as described above, irradiates the normal region and the dimming region Q with infrared rays at predetermined illuminance, acquires an image of the in-vehicle camera 6 and an image of the infrared camera 34 again (step S08), and determines whether a position of the object estimated based on the image of the in-vehicle camera 6 and a position of the object estimated based on the image of the infrared camera 34 coincide with each other (step S03).

As described above, according to the vehicle lamp system 100 of the present embodiment, since the IR light source 32 for the infrared camera 34 is controlled by comparing the image of the in-vehicle camera 6 with the image of the infrared camera 34, infrared rays are emitted in a mode suitable for the infrared camera 34, resulting in clearer output of the infrared camera 34. Since the IR light source 32 is controlled based on two cameras using different detection methods, that is, the in-vehicle camera 6 that acquires an image based on visible light and the infrared camera 34 that acquires an image based on infrared rays, it is possible to further improve accuracy of the infrared camera 34.

As shown in FIG. 1, the vehicle lamp system 100 according to the present embodiment may include an own vehicle position acquisition device 104 and an other-object position acquisition device 105. The own vehicle position acquisition device 104 acquires position information on the own vehicle using a global positioning satellite system 106 such as a GPS. The other-object position acquisition device 105 acquires position information on the pedestrian B or a bicycle from an infrastructure facility 107 or another vehicle. The other-object position acquisition device 105 acquires, via the infrastructure facility 107, a signal issued by a portable terminal 108 carried by the pedestrian B or a driver of the bicycle.

The control unit 101 may calculate a direction of the pedestrian B or the bicycle as viewed from the own vehicle, and control the IR light source 32 such that the direction of the pedestrian B or the bicycle is emphasized to be irradiated or the direction of the pedestrian B or the bicycle is prevented from being irradiated.

Reflection intensity of both visible light and infrared rays from the pedestrian B or the bicycle is weak as compared with an automobile, and it is difficult to detect the pedestrian B or the bicycle by the in-vehicle camera 6 and the infrared camera 34 in the first place. In addition to an attempt to detect the pedestrian B or the bicycle with visible light and infrared rays, presence of the pedestrian B or the bicycle can be acquired by the other-object position acquisition device 105, and detection accuracy of the pedestrian B or the bicycle by the in-vehicle camera 6 and the infrared camera 34 can be improved.

In addition, the control unit 101 may compare an other-object position of the pedestrian B or the bicycle acquired by the other-object position acquisition device 105 with the image acquired by the infrared camera 34, and when the pedestrian B or the bicycle acquired by the other-object position acquisition device 105 cannot be distinguished from the image of the infrared camera 34, the control unit 101 may set the emphasis region P at the other-object position and control the IR light source 32 such that infrared rays are emphasized to emit toward the other-object position.

When the other-object position acquisition device 105 acquires the presence of the pedestrian B or the bicycle, accuracy of information thereof is high. On the other hand, the vehicle control unit 3 obtains an accurate position of the pedestrian B or the bicycle by the infrared camera 34 or the in-vehicle camera 6. According to such a configuration, it is easy to acquire the accurate position of the pedestrian B or the bicycle by the infrared camera 34.

Further, when the control unit 101 determines that the pedestrian B or the bicycle moves in a direction crossing the front of the own vehicle based on information acquired by the own vehicle position acquisition device 104 and the other-object position acquisition device 105, the control unit 101 may set the emphasis region P in a direction in which the pedestrian B or the bicycle is present and control the IR light source 32 such that infrared rays are emphasized to emit in this direction.

In particular, when the pedestrian B or the bicycle tries to cross the front of the own vehicle, it is important for the vehicle control unit 3 to grasp the presence of the pedestrian B or the bicycle as described above. According to the present embodiment, it is easy to grasp the presence of the pedestrian B or the bicycle trying to cross the front of the own vehicle.

Furthermore, when position information on the pedestrian B or the bicycle acquired by the other-object position acquisition device 105 and position information on the pedestrian B or the bicycle estimated based on the image of the in-vehicle camera 6 coincide with each other, and the position of the pedestrian B or the bicycle cannot be estimated based on the infrared camera 34, the control unit 101 may control the IR light source 32 such that infrared rays are emphasized to emit in the direction of the pedestrian B or the bicycle. According to such a configuration, the position of the pedestrian B or the bicycle can be more reliably grasped by the infrared camera 34.

The present invention is not limited to the embodiment described above, and may be appropriately modified, improved, and the like. Materials, shapes, dimensions, numerical values, forms, numbers, arrangement places, and the like of components in the embodiment described above can be set freely and are not limited as long as the present invention can be achieved.

In addition, in the above-described embodiment, the example in which the dimming region is irradiated with infrared rays is described, but the dimming region may not be irradiated with infrared rays.

In addition, in the above-described embodiment, the configuration using the in-vehicle camera that acquires an image based on visible light and the infrared camera is described, but the present invention is not limited to the in-vehicle camera that acquires an image based on visible light, and a vehicle lamp system may be formed using another in-vehicle sensor capable of acquiring information on surroundings of a vehicle, such as a LiDAR or a radar, and the infrared camera. The infrared camera 34 may be mounted on the vehicle lamp 4 as in the above-described embodiment, or be mounted on the vehicle 1.

The present application is based on a Japanese patent application (JP2019-165514A) filed on Sep. 11, 2019, and the contents thereof are incorporated herein as reference.

INDUSTRIAL APPLICABILITY

According to the present invention, a vehicle lamp system in which detection accuracy of an infrared camera is further improved is provided.

The invention claimed is:

1. A vehicle lamp system mounted on a vehicle including an in-vehicle sensor configured to acquire information on surroundings of the vehicle, the vehicle lamp system comprising:
   an IR light source configured to emit infrared rays;
   a scanning unit configured to emit the infrared rays emitted from the IR light source toward a front of a lamp to perform scanning;
   an infrared camera having high sensitivity to a wavelength of the infrared rays emitted from the IR light source;
   a control unit determines coordinates representing a position at which a first object is present based on a data from the in-vehicle sensor, and then determines coordinates representing the position at which the first object is present based on a data from the infrared camera, wherein the control unit then estimates whether the position according to the data from the in-vehicle sensor coincides with the position according to the data from the infrared camera;
   a region setting unit configured to set at least one of a dimming region and an emphasis region based on whether the control unit determines that the position according to the data from the in-vehicle sensor coincides with the position according to the data from the infrared camera;
   a lamp control unit configured to control turning on and off and an applied power amount of the IR light source, such that a specific region is irradiated with the infrared rays emitted from the IR light source based on output of the region setting unit;
   an own vehicle position acquisition device configured to acquire position information on an own vehicle using a global positioning satellite system; and
   an other-object position acquisition device configured to acquire position information on a pedestrian or a bicycle from an infrastructure facility or another vehicle,
   wherein the lamp control unit calculates a direction of the pedestrian or the bicycle as viewed from the own vehicle, and controls the IR light source such that the direction of the pedestrian or the bicycle is emphasized to be irradiated or the direction of the pedestrian or the bicycle is prevented from being irradiated, and
   the lamp control unit compares the position information on the pedestrian or the bicycle acquired by the other-object position acquisition device with the image acquired by the infrared camera, and when the pedestrian or the bicycle acquired by the other-object position acquisition device cannot be distinguished from the image, the lamp control unit controls the IR light source such that infrared rays are emphasized to emit toward a position of the position information.

2. The vehicle lamp system according to claim 1, wherein
   if the position according to the data from the in-vehicle sensor and the position according to the data from the infrared camera do not coincide, the region setting unit sets a certain position as the emphasis region, and
   the lamp control unit controls the IR light source such that the emphasis region is irradiated with infrared rays at illuminance higher than that of other regions.

3. The vehicle lamp system according to claim 1, wherein
   the region setting unit sets, as the dimming region, a region corresponding to a pixel having a luminance higher than a predetermined value in an image acquired by the infrared camera, and
   the lamp control unit controls the IR light source such that the dimming region is irradiated with infrared rays at illuminance lower than that of other regions.

4. The vehicle lamp system according to claim 1, wherein the other-object position acquisition device is configured to acquire, via the infrastructure facility, a signal issued by a portable terminal carried by the pedestrian or a driver of the bicycle.

5. The vehicle lamp system according to claim 1, wherein when the lamp control unit determines that the pedestrian or the bicycle moves in a direction crossing a front of the own vehicle based on information acquired by the own vehicle position acquisition device and the other-object position acquisition device, the lamp control unit controls the IR light source such that infrared rays are emphasized to emit in the direction of the pedestrian or the bicycle.

6. The vehicle lamp system according to claim 1, wherein when the position information on the pedestrian or the bicycle acquired by the other-object position acquisition device and position information on the pedestrian or the bicycle acquired by the in-vehicle sensor coincide with each other, and a position of the pedestrian or the bicycle cannot be estimated based on the infrared camera, the lamp control unit controls the IR light source such that infrared rays are emphasized to emit in the direction of the pedestrian or the bicycle.

7. The vehicle lamp system according to claim 1,
   wherein, the emphasis region is irradiated with infrared rays at an illuminance higher than an illuminance at which a normal region is irradiated with infrared rays.

8. The vehicle lamp system according to claim 1, wherein the control unit determines the presence of an object based on a determination that the position according to the data from the in-vehicle sensor coincides with the position according to the data from the infrared camera.

9. A vehicle lamp system mounted on a vehicle including an in-vehicle sensor configured to acquire information on surroundings of the vehicle, the vehicle lamp system comprising:
   an IR light source supplied with a first current value and configured to emit infrared rays;
   a scanning unit configured to emit the infrared rays emitted from the IR light source toward a front of a lamp to perform scanning;
   an infrared camera having high sensitivity to a wavelength of the infrared rays emitted from the IR light source;
   a control unit determines coordinates representing a position at which a first object is present based on a data from the in-vehicle sensor, and then determines coordinates representing the position at which the first object is present based on a data from the infrared camera, wherein the control unit then estimates whether the position according to the data from the in-vehicle sensor coincides with the position according to the data from the infrared camera;

a region setting unit configured to set at least one of a dimming region and an emphasis region based on whether the control unit determines that the position according to the data from the in-vehicle sensor coincides with the position according to the data from the infrared camera; and a lamp control unit configured to control turning on and off and an applied power amount of the IR light source, such that a specific region is irradiated with the infrared rays emitted from the IR light source based on output of the region setting unit, wherein if the position according to the data from the in-vehicle sensor and the position according to the data from the infrared camera do not coincide, and if the position according to the in-vehicle sensor data corresponds to a luminance value higher than a predetermined value in an image acquired by the infrared camera:

the region setting unit sets the position according to the data from the in-vehicle sensor data as the dimming region, and the lamp control unit supplies the IR light source with a third current lower than the first current such that the dimming region is irradiated with infrared rays at illuminance lower than that of other regions.

10. The vehicle lamp system according to claim 9, wherein if the position according to the data from the in-vehicle sensor and the position according to the data from the infrared camera do not coincide, and if the position according to the data from the in-vehicle sensor corresponds to a luminance value lower than a predetermined value in an image acquired by the infrared camera:

the region setting unit sets the position according to the data from the in-vehicle sensor is set as the emphasis region, and the lamp control unit supplies the IR light source with a second current greater than the first current such that the emphasis region is irradiated with infrared rays at illuminance higher than that of other regions.

* * * * *